Aug. 7, 1928.

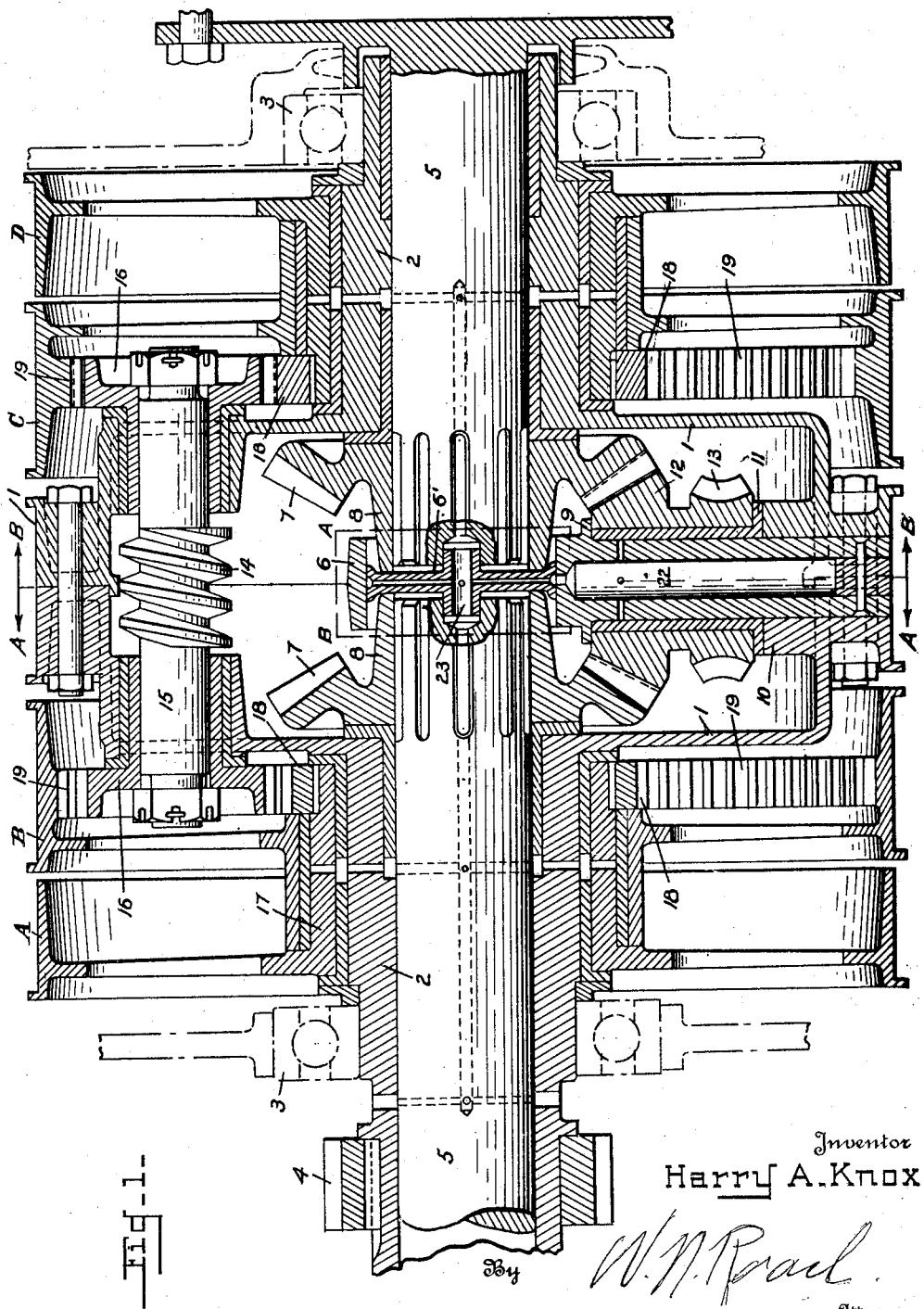

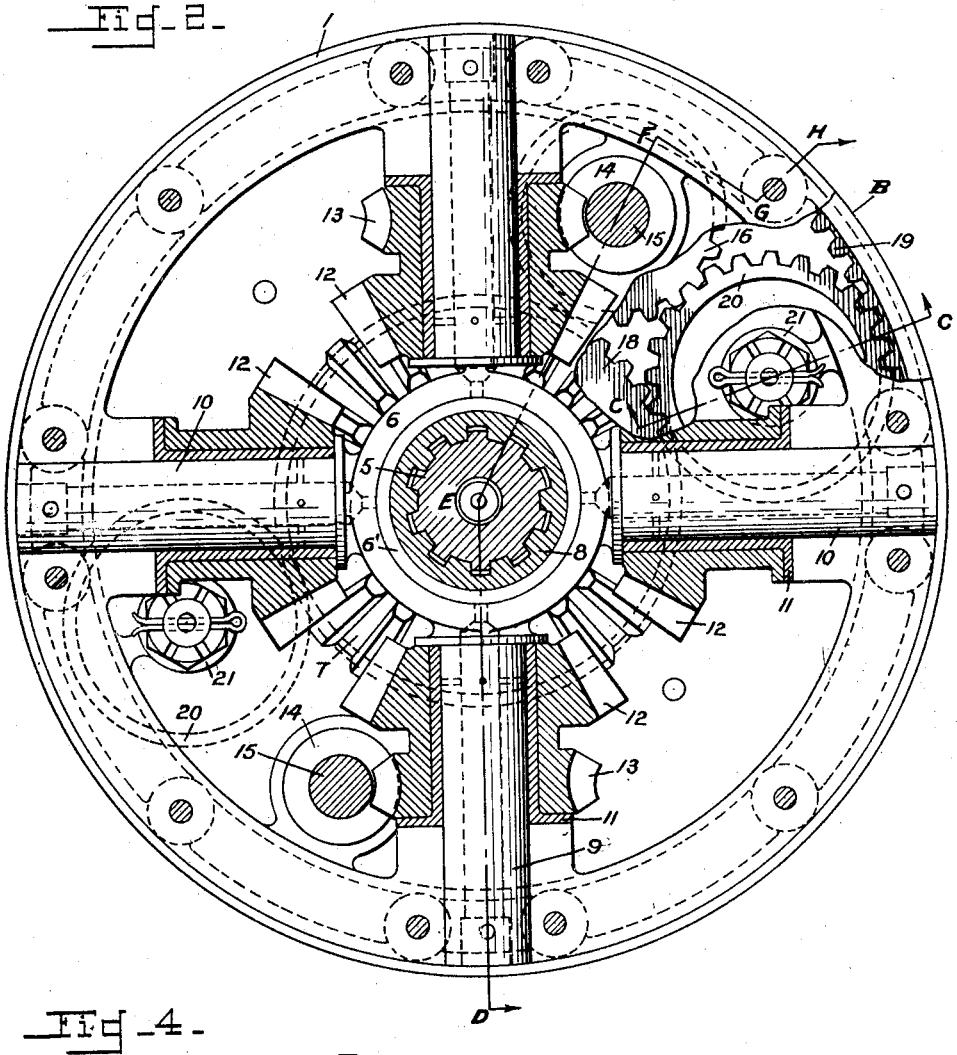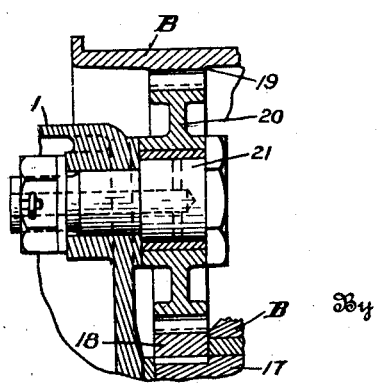

H. A. KNOX 1,679,610

DOUBLE RADIUS CONTROLLED DIFFERENTIAL

Filed Nov. 8, 1924   3 Sheets-Sheet 3

Inventor

Harry A. Knox

By W. N. Roach

Attorney

Patented Aug. 7, 1928.

1,679,610

UNITED STATES PATENT OFFICE.

HARRY A. KNOX, OF DAVENPORT, IOWA.

DOUBLE-RADIUS-CONTROLLED DIFFERENTIAL.

Application filed November 8, 1924. Serial No. 748,892.

(GRANTED UNDER THE PROVISIONS OF THE ACT OF MARCH 3, 1883, 22 STAT. L., 625.)

The invention described herein, if patented, may be manufactured and used by or for the Government for governmental purposes without the payment to me of any royalty thereon.

The subject of this invention is a double radius controlled differential.

The invention relates particularly to power controlled steering apparatus especially applicable to vehicles of the tractor type, in which parallel self-laying tracks carry the entire weight of the vehicle.

In track laying vehicles of this type the steering is usually effected either through a clutch mechanism which completely retards movement of the pivot track and causes the vehicle to be jerked about, or, through a controlled differential which causes the tracks to be laid down on arcs of concentric circles, the speed of the pivot track being decreased and that of the outer track proportionately accelerated.

In the latter method the turning radius of the vehicle will always be the same, irrespective of the speed at which the vehicle is driven, because of the ratio between the speed of the two tracks.

The principal object of the present invention is to provide a novel form of differential controllable to afford a dual turning radius, the shorter radius being preferably one-half of the larger radius. This selection of multiple turning radii is of considerable tactical importance when the vehicles are employed in warfare while obviously being a desirable innovation when the vehicles are used in commercial pursuits.

Further objects of the invention are: to provide a differential assembly having a revolving casing and brake drums of equal diameter symmetrically arranged to constitute a compact and efficient controlled power transmitting unit; to permit the use of the differential casing as a brake drum; to concentrically arrange dual brake drums on each side of the casing for producing a selection of variable speeds of the driven axles; to obtain corresponding reverse movement of the worm shaft or shafts by providing an idler on only one side of the casing; and, to avoid the use of a multiplicity of parts by arranging the brake drums on each side of the casing so as to control right or left turns on respective alternate radii.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a sectional view on the plane of the axle taken on the line DEFGH of Fig. 2;

Fig. 2 is a sectional view on the line A—A of Fig. 1;

Fig. 4 is a sectional view on the line C—C of Fig. 2.

Figure 3:
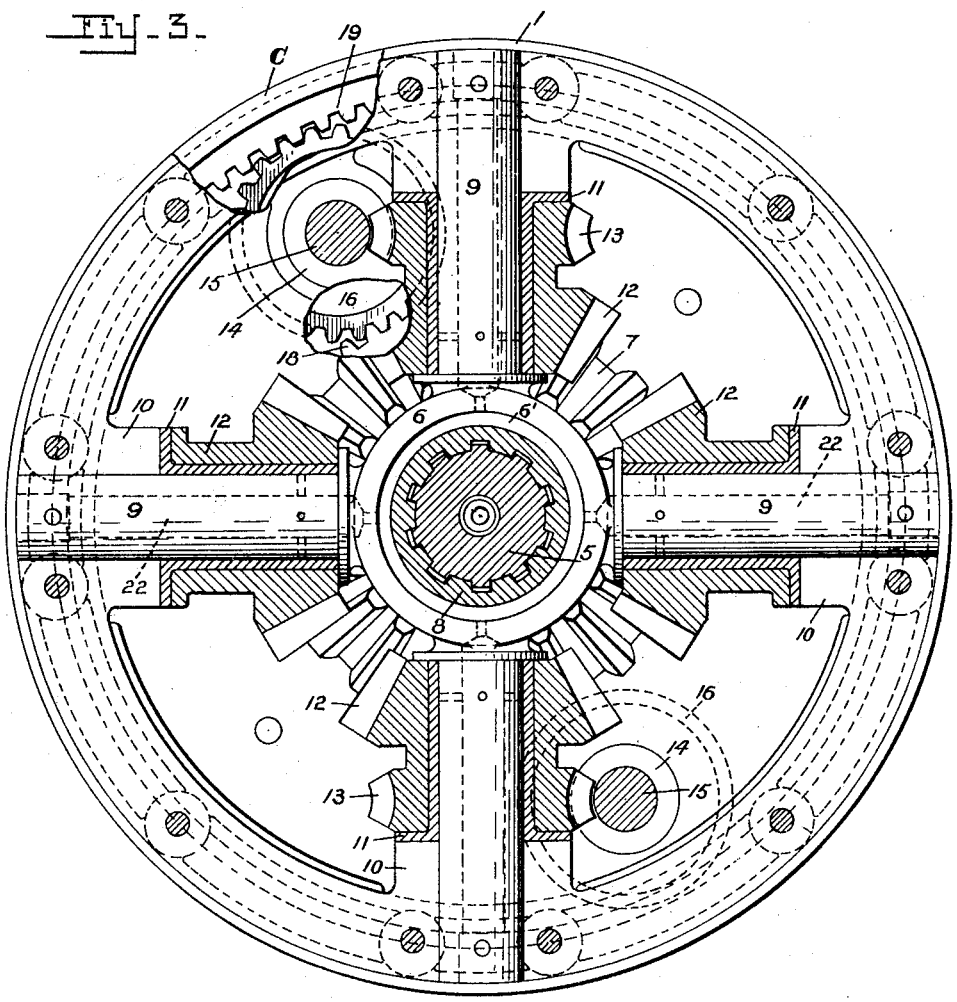
Fig. 3 is a sectional view on the line B—B of Fig. 1.

Referring to the drawings by numerals and characters of reference:

The differential casing 1, preferably consisting of two pieces, is formed with extension sleeves 2, supported in bearings 3 carried by the transmission casing (not shown). One of the sleeves is provided with a spur gear 4 through which power is transmitted from a motor to revolve the differential casing.

Disposed in the sleeves are collinear axles 5—5 which carry the driving or track laying wheels of the vehicle and which are spaced by the web 6' of a spider 6 in the center of the casing 1. Keyed on the adjacent ends of the axles within the casing are bevel gears 7 each having an annular flange 8 abutting the web.

The spider 6 includes opposite pairs of radial arms 9 anchored in sockets 10 on the rim of the casing and cooperating therewith to properly position bushings 11 on the arms for mounting bevel planet pinions 12 in meshing engagement with the bevel gears 7 on the axle. Integral with or formed on one set of the bevel pinions 12 are worm wheels 13 which are engaged by worms 14 on spindles 15 journaled in the casing and to the extremities of which are keyed spur pinions 16 disposed outside the casing. It will be noted that the worms 14 engage the worm wheels 13 on opposite sides of the radial arms 9 for the purpose of driving the corresponding combination bevel pinions 12—12 in opposite directions, as clearly indicated in Figures 2-3.

Mounted on bushings on the sleeves 2 are outer brake drums A and D, each having an inwardly disposed annular flange 17 on which is keyed or formed an external spur 18. On the annular flanges of these members are mounted inner brake drums B and C of the same diameter as the outer drums, and on the inner drums are formed internal gear wheels 19. Both the external spur 18 and the internal gear 19 on the drums A and B are in mesh with a pair of idlers 20 (Figs. 2 and 4) mounted on a stub shaft 21 carried by the casing 1 and the idlers in turn are in mesh with the left hand spur pinions 16 on the spindle 15.

The gears 18 and 19 on the brake drums D and C mesh directly with the right hand spur pinions 16 for the purpose of obtaining a rotational movement of the pinions 16 and worms 14 reverse to the movement transmitted from the respective opposite brake drums A and B.

Turning of the vehicle may be effected on radii of different lengths by reason of the relative size of the gears 18 and 19 on the outer and inner drums, the ratio herein shown being adapted to provide a turning movement respectively on a 40 and a 20 foot radius. The gearing is so arranged that the control of the vehicle for a right hand turn is through the brake drums B and D and for a left hand turn through the brake drums A and C.

The differential casing 1 is formed with a symmetrical periphery adapted to receive a braking mechanism on the application of which the rotational movement of the casing may be retarded or arrested to reduce the speed of the vehicle when proceeding on a straight course.

The operation of the device is as follows:
When the vehicle is proceeding on a straight course the differential casing 1 and the brake drums A, B, C and D revolve as a unit, the planet pinions 12 remaining motionless and serving as a lock or clutch to secure uniform and continuous rotation of both axles in the customary manner.

If it is desired to change the course of the vehicle to the right on a 20-foot radius the brake-drum B is retarded or completely arrested and through the idlers 20 imparts forward rotary movement through the internal gear 18 and spur 16 to the spindle 15 and worm 14 on its own axis which in turn rotates the bevel pinions 12 in the direction of movement of the right hand or pivot bevel gear 7 in addition to the rotation of the entire differential mechanism, thereby causing the right axle to slow up. Although the planet pinions 12 revolve about the pivot bevel gear 7 rotating it a decreased speed they still act by reason of their corresponding reverse rotational engagement on the outer or left hand bevel gear 7 as a clutch therefor serving to accelerate its rotation in the same degree that the pivot bevel gear is decreased or diminished.

In making a left hand turn on a 40 foot radius, the brake drum A is retarded and by reason of the arrangement of the gearing the external gear 19 through the idler 20 will impart a reverse or rearward rotational movement to the worm 14 at a different rate of speed causing the planet pinions 12 to revolve in the direction of the left hand or pivot bevel gear 7 to decrease its rotational velocity while correspondingly accelerating the outer or right hand gear 7.

The operation of the brake drums C and D which directly engage the spurs 16 to control the movement and the direction of movement of the spindle 15 and its train of gears will be readily apparent to those skilled in the art.

The radial arms 9 may be formed with reservoirs 22 in communication with passages 23 in the web for the purpose of circulating a lubricant to the movable elements of the differential.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A differential steering gear embodying two axle shafts, a bevel gear on each shaft, a casing formed with sleeves mounted on said shafts, pinions radially mounted within the casing and in mesh with said bevel gears, worm wheels on two of said pinions, transverse spindles journaled in the casing, worms thereon meshing with said worm wheels, spurs on both ends of said spindles and disposed without the casing, idlers mounted on one side of the casing and meshing with the spurs, outer brake drums mounted on the sleeves of the casing, said drums having a central annular flange formed with an external gear, inner brake drums concentric on the outer drums and formed with an internal gear, said external and internal gears being directly in mesh with the spurs on one side of the casing, and in mesh with the idlers on the opposite side.

2. A differential steering gear embodying two axle shafts, a bevel gear on each shaft, a casing mounted on said shafts, pinions radially mounted within the casing and in mesh with said bevel gears, worm wheels on one set of oppositely disposed pinions, spindles journaled in the casing, worms thereon meshing with said worm wheels, spurs on both ends of the spindles and disposed without the casing, idlers carried by the casing on one side thereof and in mesh with the spurs, a pair of brake drums having the same diameter as the casing and mounted on each side of the casing parallel thereto, a large gear formed on the inner drums and a small gear on the outer drums, said gears being in mesh with the spurs on one side of the casing and in mesh with the idlers on the opposite side.

3. A differential steering gear embodying two axle shafts, a bevel gear on each shaft, a casing rotating about the axis of the shafts, pinions radially mounted within the casing and meshing with said bevel gears, at least one of said pinions having a worm wheel, a spindle in said casing parallel to the axle shaft and provided with a worm meshing with the worm wheel, brake drums, gearing connecting the brake drums with the worm, the selective retardation of said drums causing forward or reverse rotation of said worm on its axis at variable speeds.

4. A differential steering gear for motor vehicles embodying two driven parts, a casing rotating about the axis of said parts, pinions connecting the casing and driven parts and normally locked for maintaining the vehicle on a straight course, a plurality of brake drums on each side of said casing geared to said pinions and serving when braked to selectively rotate said pinions in opposite directions and at different rates of speed for altering the course of the vehicle.

5. In a differential steering gear for motor vehicles, the combination with planet pinions, of worm wheels fast on said pinions, worms meshing with said worm wheels for locking the same to maintain the vehicle on a straight course, and positive means for rotating the worms at different rates of speed to change the course of the vehicle.

6. A differential steering gear embodying a rotatable casing formed with axial sleeve extensions, a brake drum mounted on each of said extensions and having an external gear formed on its hub adjacent the casing, and an internally geared brake drum interposed between the casing and said first mentioned drums and mounted on the latter, all of said drums and the casing being of equal diameter and mounted in parallel relationship.

7. A differential steering gear embodying a rotatable casing formed with axial sleeve extensions, a brake drum mounted on each of said extensions and having an external gear formed on its hub adjacent the casing, and an internally geared brake drum interposed between the casing and said first mentioned drums and mounted on the latter.

8. A differential steering gear embodying a rotatable casing, transverse spindles in the casing, spur gears keyed on said spindles and disposed without the casing, idlers mounted on one side of the casing and meshing with corresponding spurs, and a pair of brake drums provided with gears mounted parallel to the casing on either side thereof, one of said pairs meshing directly with the spurs and the other pair meshing with the idlers.

HARRY A. KNOX.